Jan. 18, 1966 C. F. CAMILLERI 3,229,392
TRAVEL IRON AND FOLDING HANDLE THEREFOR
Filed Nov. 2, 1964 2 Sheets-Sheet 1

Inventor:
Charles F. Camilleri
By Bair, Freeman & Molinare
Attys.

Jan. 18, 1966   C. F. CAMILLERI   3,229,392
TRAVEL IRON AND FOLDING HANDLE THEREFOR
Filed Nov. 2, 1964   2 Sheets-Sheet 2
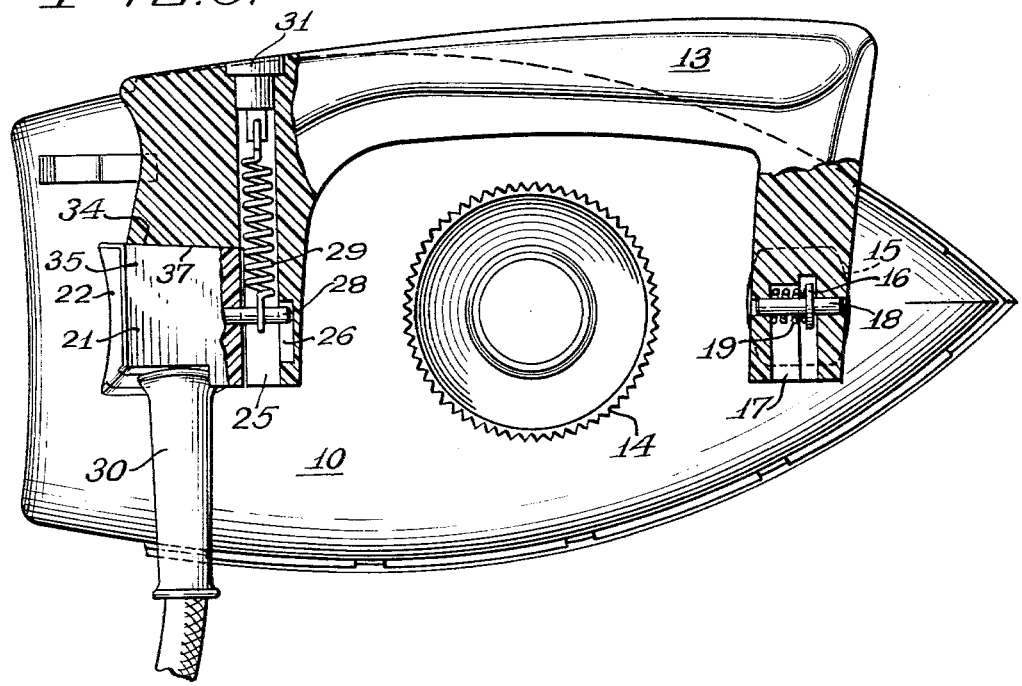
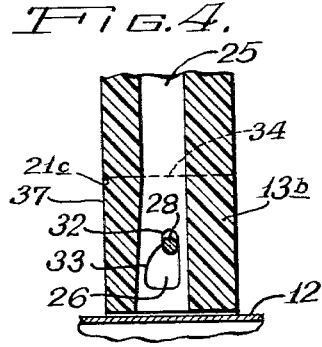
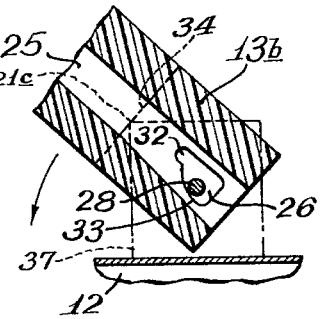
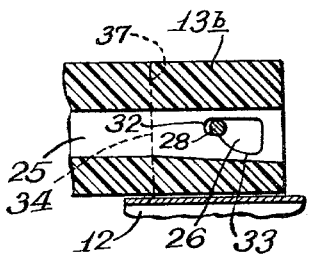
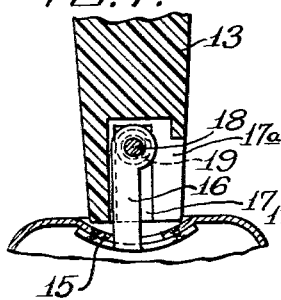
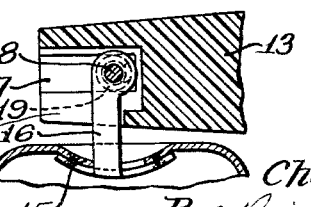
Inventor:
Charles F. Camilleri
By Bair, Freeman & Molinare
Attys.

United States Patent Office 3,229,392
Patented Jan. 18, 1966

3,229,392
TRAVEL IRON AND FOLDING HANDLE THEREFOR
Charles F. Camilleri, St. Louis, Mo., assignor to Knapp-Monarch Company, St. Louis, Mo., a corporation of Delaware
Filed Nov. 2, 1964, Ser. No. 408,242
3 Claims. (Cl. 38—90)

My invention relates to a travel iron and a novel folding handle therefor.

It is an object of the invention to provide a folding handle on a travel iron which has position retaining, or firm fitting, means and characteristics whereby the handle tends to remain in selected positions, either in the raised or ironing position or is in the folded position.

It is another object of the invention to provide an improved folding handle for a travel iron wherein the handle has improved position retaining characteristics of offering substantial resistance to movement out of position both when the handle is being moved from the ironing position to the folded position, and vice versa.

It is a further object of the invention to provide a folding handle for a travel iron including a spring cooperating with a floating pivot for a roll pin to provide position retaining character to the handle when it is in the ironing position or in the folded position, and which still provides for simple movement from one position to the other.

The above and other objects and features of the invention will be more readily apparent from the following description when read in connection with the accompanying drawings, in which:

FIGURE 3 is a top plan view of the iron with the handle in the folded position and with the handle shown partially in section;

FIGURE 4 is a partial sectional view of the handle taken on line 4—4 of FIGURE 2 when the handle is in the ironing position;

FIGURE 5 is a view similar to FIGURE 4 when the handle is being moved from the ironing position to the folded position;

FIGURE 6 is a view similar to FIGURE 4 with the handle in the folded position;

FIGURE 7 is a partial sectional view taken on line 7—7 of FIGURE 2 with the handle in the ironing position; and FIGURE 8 is a view similar to FIGURE 7 with the handle in the folded position.

Figure 1:
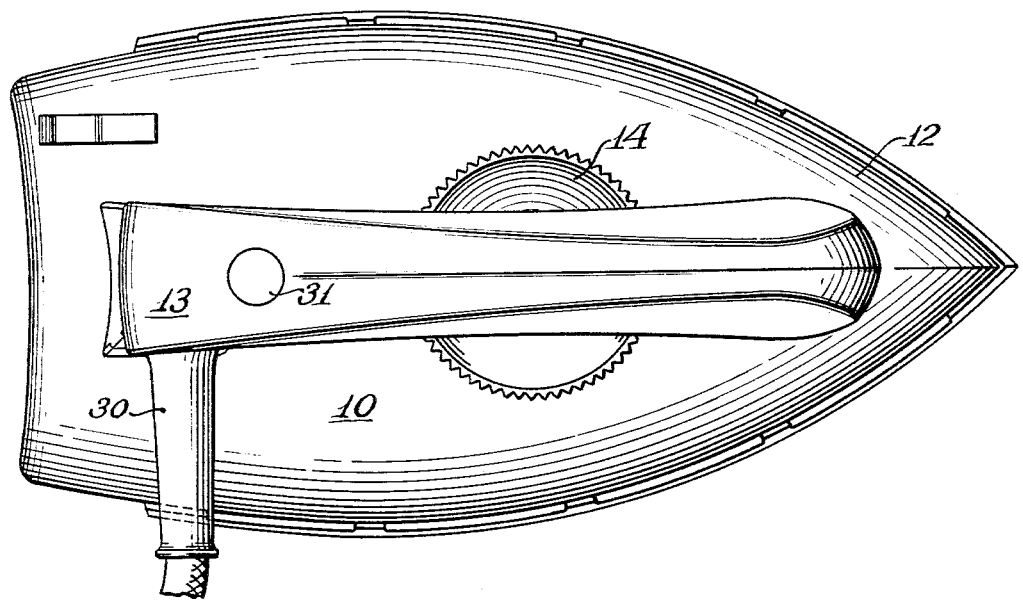
FIGURE 1 is a top plan view of the iron embodying my invention, with the handle in the ironing position.

Referring specifically to the drawings for a detailed description of the invention, numeral 10 designates the iron generally, which includes a sole plate 11, a shell or hood 12, and a handle generally indicated at 13. The handle comprises a horizontal gripping portion 13a, a depending rear leg 13b and a depending front leg 13c. A temperature control knob 14 may be provided on the top of the shell 12.

Figure 2:
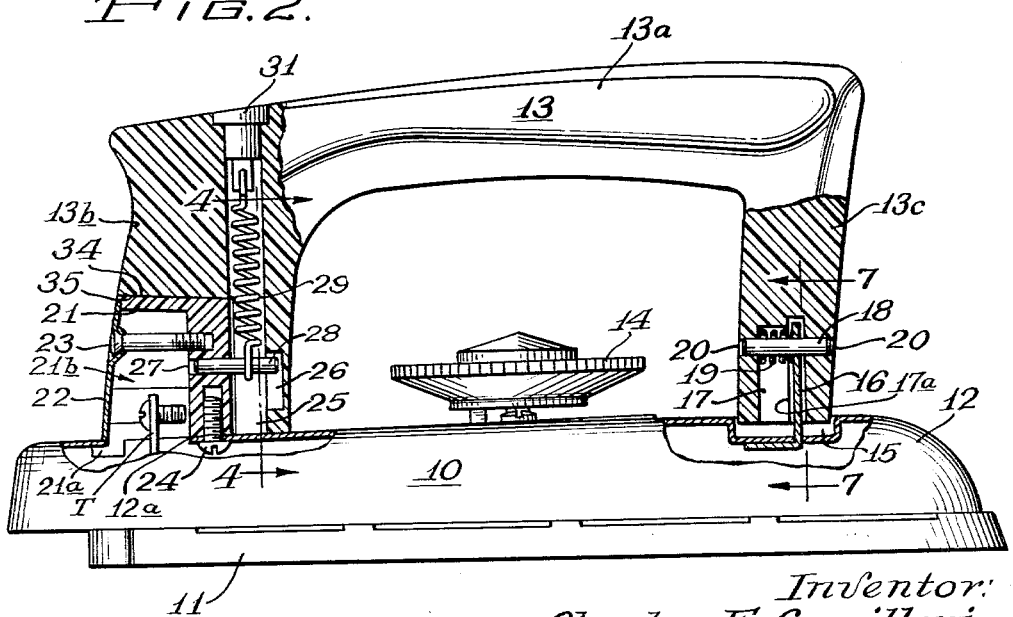
FIGURE 2 is a side view partially in section of the travel iron shown in FIGURE 1 with the handle in the ironing position.

The shell 12 has a depression 15 provided therein, and a bracket or post 16, secured to the inside of shell 12, extends upwardly through an opening in the bottom wall of the depressed portion 15 as shown in FIGURES 2, 7 and 8, the bracket preferably being welded to the underside of shell 12. The handle 13 is generally made of a plastic material which remains sufficiently cool for the person using the iron to grasp. An elongated cavity 17 is provided in the lower end of the front handle leg 13c extending longitudinally from the terminus of the leg 13c upwardly. A roll pin 18 carried by leg 13c is loosely journalled in an opening in post 16 to serve as a pivot for the forward portion of handle 13. The pin 18 is press fit into openings 20 on both sides of the cavity 17. The pin carries a coil spring 19 positioned between a portion of leg 13c and the post 16. The cavity 17 opens laterally through a slot 17a in leg 13c, thereby providing for movement of handle 13 relative to post 16, as best seen in FIGURES 7 and 8.

Mounted on shell 12 at the rear end thereof is a hollow post or base 21, formed of plastic material. The base 21 is shaped to engage the upper surface of shell 12 and to provide a pair of spaced shouldered lugs 21a which enter an opening 12a defined in shell 12 to engage the underside of shell 12 and an edge of opening 12a, as best seen in FIGURE 2. A screw 24 tightly clamps base 21 to shell 12. The hollow or cavity 21b in base 21 provides a space in which connection may be made between terminals of cord 30 and terminals, such as T, leading to an energizing element (not shown) in operative association with the iron's sole plate 11. The cavity 21b is closed off by a closure plate 22 that is held in position on post 21 by screw 23.

An opening or bore 25 extends longitudinally completely through the rear leg portion 13b of the handle, and a second cavity or depression 26 is defined which communicates with the longitudinal opening 25 but is generally to one side of opening 25. A roll pin 28 is press fit into an opening 27 defined in the base member 21 and projects across opening 25 and into the cavity 26. The pin 28 is mounted in substantially axial alignment with pin 18. An elongated coil spring 29 under tension is positioned in bore 25 and is connected at one end to the roll pin 28 and at the other end to a spring mounting stud 31 carried in handle 13. The spring 29 is constantly under substantial tension. When the handle 13 is erect as shown in FIGURE 2, the spring biases handle 13 downwardly toward seating engagement with the upper end of post 21.

The upper surface of post or base 21 provides a generally flat seat 35 having a camming corner or edge 21e, as best seen in dot-dash lines in FIGURES 4 and 5, which is adapted to cooperate with a camming shoulder, or surface, 34 defined in the leg 13b of the handle. When handle 13 is pushed to the left as seen in FIGURES 4 and 5, the camming shoulder 34 on handle 13 rides over the camming edge 21c on base 21 under the bias of tension spring 29. The length of leg 13b is such that when handle 13 is erect, leg 13b terminates spaced above shell 12 as best seen in FIGURE 4, so as to accommodate the pivotal movement of handle 13 without scraping against the shell 12.

The recess 26 is provided with an offset crotch, or notch, 32 in which the roll pin 28 normally lodges in a dwell position when the handle is in fully erect (FIGS. 2 and 4) or folded (FIGS. 3 and 6) positions. The locating of pin 28 in notch 32 during dwell position provides for stability of the handle 13 in both positions. Additional force is necessary to move the handle radially of pin 28 and against the bias of spring 29 to swing the handle from either dwell position (FIG. 4 or 6) to the intermediate position (FIG. 5), but the camming action between shoulder 34 and edge 21e on post 21 assists in developing the additional forces required for such movements. The shape of cavity 26 is rounded at 33 to accommodate the movement of handle 13 relative to pin 28 without any catching or jamming.

The bottom camming surface 34 of leg 13b is generally flat so as to permit as much seating against a flat contact as possible between leg 13b and post 21 under the bias exerted by spring 29 and so that handle 13 will be rigidly retained, without take-up or vibratory movement, in the ironing, or erect, position of FIGURE 4. When the handle 13 is in folded position, the surface 34 is biased toward an upright flat side 37 of post 21, as seen in FIGURES 3 and 6, to maintain handle 13 in rigid, non-vibratory relation on the iron.

The slot 17a in front of leg 13c insures that the handle 13 may be pivoted in only one direction between erect position and folded position. This factor advantageously allows entry of energizing cord 30 through one upright side wall of post 21, namely the one opposite side 37 against which handle 13 swings as it is being folded.

When the handle is in the raised position shown in FIGURES 1 and 2 and is then moved toward the folded position shown in FIGURE 3, the flat surface 34 of the handle leg 13b cams about the corner edge 21c of post 21 and thus raises the handle against the bias of spring 29 a sufficient distance to permit the handle to be moved to the folded position. Alternately, the user may pull the handle 13 upwardly against the bias of spring 29 to pivot the handle to the folded position.

From the foregoing it will be apparent that I have provided a floating cavity or pivot hole in the rear leg of the handle of a travel iron in conjunction with a tension spring at the rear end between the handle and a rear post rigidly mounted to the shell or hood of the iron. The top of the rear post is adapted to relatively rigidly engage an abutment surface on the rear leg of the movable handle so that the spring urges the handle into substantially rigid erect position when the handle is raised, and also urges the handle into rigid, non-vibratory position against the rear post when the handle is lowered. The floating pivot in the rear of the handle with the spring and handle arrangement makes possible an "over-center" or dwell condition which provides resistance to undesirable movement of the handle when it is either in the erect or folded conditions. The relative flexibility of the arrangement between pin 18 and post 16 accommodates slight angular displacement of the axis of pin 18 relative to the axis of pin 28 during the movement of handle 13 between the two dwell positions.

While one embodiment of the invention has been shown and described herein, it will be understood that it is illustrative only and not to be taken as a definition of the scope of the invention, reference being had for this purpose to the appended claims.

I claim as my invention:

1. An improved folding handle for a travel iron of the type having a handle movable between erect and folded positions, said improved folding handle comprising, in combination: an iron shell, spaced front and rear supports on said shell extending thereabove, pivot pins operatively associated with said supports in substantial parallelism, handle means defining a front leg and a rear leg mounted on said pivot pins for pivoting movement thereabout, one of the supports providing two dwell surfaces thereon substantially at right angles to each other, one of the legs providing an abutment surface for abutment selectively against either of the two dwell surfaces on said one support, tension spring means biasing said abutment surface of the leg toward seating against one dwell surface when the handle is in erect position and against the other dwell surface when the handle is in the folded position, means on said one support defining a high cam between said two dwell positions to normally retain said handle in each of the two positions against inadvertent movement away from either of the dwell positions, the high cam being formed as a corner at the intersection between the two dwell surfaces, the abutment surface on the handle leg being caused to cam over said corner and move further away from the axis of the pivot pin, and against the increasing bias of the tension spring, as the handle moves between dwell positions, and the other support and pivot pin associated therewith including cooperating means to accommodate a mis-alignment of pivot pins which occurs when the handle moves between dwell positions.

2. An improved folding handle as in claim 1 wherein the tension spring is concealed in one leg of the handle, and said one leg of the handle is provided with an enlarged recess to accommodate relative radial and angular movement between said one leg of the handle and the associate pivot pin.

3. An improved folding handle as set out in claim 2 wherein said enlarged recess is elongated and provides a curved wall along which the pivot pins slides during movement of the handle between dwell positions.

References Cited by the Examiner

UNITED STATES PATENTS

D. 126,437    4/1941    Huffman    38—90 X

FOREIGN PATENTS 107,052    4/1939    Australia.

JORDAN FRANKLIN, *Primary Examiner.*